United States Patent [19]

Robinson et al.

[11] 4,187,211
[45] Feb. 5, 1980

[54] FORMULATION AND MANUFACTURE OF ANTIFOULING COMPOSITIONS

[75] Inventors: Alan V. Robinson; John Chapman, both of Tyne and Wear, England

[73] Assignee: Camrex Research and Development, Ltd., Sunderland, England

[21] Appl. No.: 888,592

[22] Filed: Mar. 20, 1978

[30] Foreign Application Priority Data

Mar. 21, 1977 [GB] United Kingdom ............... 11900/77

[51] Int. Cl.$^2$ ............................................. C08K 5/57
[52] U.S. Cl. ............................ 260/42.44; 260/45.75 C
[58] Field of Search ................... 260/45.75 C, 42.44; 106/15 FP; 424/26, 81, 141, 140

[56] References Cited

U.S. PATENT DOCUMENTS

| | | | |
|---|---|---|---|
| 3,105,000 | 9/1963 | Hardy | 424/288 |
| 3,210,394 | 10/1965 | Nemec et al. | 424/141 |
| 3,257,194 | 6/1966 | Miller | 424/288 |

FOREIGN PATENT DOCUMENTS

| | | |
|---|---|---|
| 1124297 | 8/1968 | United Kingdom . |
| 1270922 | 4/1972 | United Kingdom . |
| 1434234 | 5/1976 | United Kingdom . |

*Primary Examiner*—V. P. Hoke
*Attorney, Agent, or Firm*—McAulay, Fields, Fisher & Goldstein

[57] ABSTRACT

Antifouling compositions or paints with a high degree of stability and toxic to marine life comprising the combination of (a) cuprous oxide; (b) one or more triorganotin polymer or copolymer carboxylates and (c) at least one relatively inert dehydrating agent of low water solubility which is capable of taking up water either physically or chemically; and optionally also comprising other toxic or non-toxic resin or pigment components, non-aqueous diluents, thinners, extenders or solvents, together with other conventional additives.

The component (c) is preferably a relatively inert metal salt of low water solubility, e.g. calcium sulphate in anhydrous or hemi-hydrate form and the polymer or copolymer is generally a substituted or unsubstituted vinyl or acrylic triorganotin polymer or copolymer carboxylate, copolymers being preferred to give the desired choice of physical or mechanical properties.

11 Claims, No Drawings

FORMULATION AND MANUFACTURE OF ANTIFOULING COMPOSITIONS

This invention relates to improvements in the formulation and manufacture of antifouling compositions, of the ablative type. The purpose of antifouling paints is to prevent the accumulation on the external hull of the ship or other immersed structure of sessile organisms, both vegetable (algae and diatoms) and animal (e.g., barnacles, tube worms and hydroids), which contribute to the drag on the vessel as a result of their roughening effect.

The existance of the coating itself, since it cannot be applied without defect, contributes to the roughness of the hull. The accumulation of repeated coatings on the vessel and the aggregation of defects, damage and corrosion, also contribute to the roughening of the hull. The desire to overcome these defects of application and accumulation has given rise to a new generation of antifouling paints or like compositions which become smoother in service due to controlled ablation of the surface, mediated by turbulent mass transfer in the laminar sub-layer.

Of the antifouling biocides in current use, that traditionally used, cuprous oxide, is still one of the most valuable by reason not only of its spectrum of activity against a wide range of fouling organisms, but also because of its acceptably low mammalian toxicity (by skin absorption at least) and comparative economy.

U.K. Pat. No. 1,124,297 proposes inter alia as an antifouling paint the combination of cuprous oxide and an organotin polymer or copolymer, e.g. tri-n-butyltin methacrylate or tri-n-butyltin acrylate, or copolymer, e.g. tri-n-butyltin methacrylate-methylmethacrylate copolymer or tri-n-butyltin methacrylate-methylmethacrylate-n-butyl acrylate copolymer.

As our own tests show (see Table I below), the combination of cuprous oxide with these polymers or copolymers is particularly advantageous but, unfortunately, the resulting paint formulations lack stability, as our own tests have also confirmed. Stability is particularly necessary in the case of antifouling compositions which are often stored or transported over several months. We believe that it is this observed instability which has hitherto prevented such formulations from becoming established in commercial use.

Our investigations and study of the possible interactions between the components of such paint formulations have led to the discovery that cuprous oxideorganotin polymer formulations are extremely sensitive to water.

The presence of water in these formulations arises in several ways. The solvents, pigments and plasticisers used in the compositions frequently contain or acquire traces of moisture as a result of manufacture, storage and handling. Furthermore, the triorganotin carboxylates prepared from triorganotin hydroxides and carboxylic acids evolve water during manufacture, and this is frequently difficult to remove completely at the resin manufacturing stage.

According to our invention we provide an antifouling composition with a high degree of stability comprising cuprous oxide as a pigment which is toxic to marine life; at least one triorganotin polymer or copolymer of the formula:

wherein $R^1$, $R^2$ and $R^3$, which may be the same or different, are alkyl, cycloalkyl, aralkyl, aryl or alkaryl, which may have one or more substituents, and X is a residue of an organic polymer or copolymer derived from an organic mono-, di- or tri-carboxylic acid and linked to the triorganotin moiety ($SnR^1R^2R^3$) through the carboxyl group (COO); and a dehydrating agent as herein defined.

In the above formula (I) X is generally the residue of a vinyl, α-methylvinyl or vinylphenyl polymer or copolymer. Copolymers are generally preferred since this allows the introduction into the residue X of additional components providing desirable physical characteristics in the eventual paint formulation.

As regards the substituents $R^1$ to $R^3$ in formula (I), alkyl is generally $C_{1-10}$ alkyl and preferably $C_{2-4}$ alkyl, e.g. ethyl, n-propyl, isobutyl, n-butyl, sec-butyl, tert-butyl, amyl, hexyl, octyl, isooctyl or nonyl. Cycloalkyl is generally $C_{3-10}$ cycloalkyl, and preferably $C_{3-7}$ cycloalkyl, e.g. cyclopentyl or cyclohexyl. The best results are obtained with ethyl, propyl and butyl radicals, in particular tri-n-butyl, although the R radicals need not be the same.

When R is alkyl, we prefer that the total number of carbon atoms in the three R radicals ($R^1$, $R^2$, $R^3$) should be in the range of 6 to 12 and most preferably 9 to 12 (see, in this connection M. & T. Chemicals Inc. U.K. Pat. No. 1,058,701, referred to again below).

The alkyl or cycloalkyl radicals may carry various substituents, e.g. chloro, bromo, ether, alkenyl or aryl substituents (loc. cit.)

As regards the aryl substituents in formula (I), phenyl is preferred and this also may carry one or more chloro, bromo, ether, alkyl or like substituents. Examples include, chlorophenyl, bromophenyl, nitrophenyl, tolyl, xylyl and ethylphenyl.

Simularly, the alkaryl and aralkyl substituents are preferably respectively phenylalkyl and alkylphenyl, and they may be substituted, for example by one of more halo, e.g. chloro or bromo, ether, alkenyl, alkynyl or like substituents.

The paint formulations of our invention in contrast to the cuprous oxide formulations previously proposed in the above-noted U.K. Pat. No. 1,124,297 are sufficiently stable for commercial use even when stored or transported for several months.

While we do not wish to be bound by any particular theory, we have evolved the following explanation of the instability of the previously proposed cuprous oxide-organotin polymer compositions. As stated above, we believe this instability is caused by the presence of water even in small amounts.

Two effects are believed to occur:
(A) The organotin compounds which are the products of reversible reactions between weak bases and weak acids as follows:

are readily dissociated in the presence of water which drives the above reaction (1) to the left in accordance with well-known chemical theory.

(B) The cuprous oxide of commerce contains inter alia small amounts of cupric or divalent copper ($Cu^{++}$) and, in addition, cuprous oxide is metastable and prone in the presence of water either to oxidation or to diproportionation.

While antioxidants to minimise the production of cupric ion ($Cu^{++}$), and complexing agents to chelate such cupric ions as are produced, have been found to moderate the rate of gelation, neither of these expedients has been found to be wholly successful in ensuring the long-term stability of the compositions.

In contrast, the combination according to the present invention of a dehydrating agent, such as anhydrous calcium sulphate or calcium sulphate hemi-hydrate, with cuprous oxide and an organotin carboxylate polymer or copolymer yields an antifouling composition of greatly improved stability under the various operating conditions discussed above.

The ablative properties of the compositions herein described are due to the sea-water hydrolysis of the vinyl or acrylic organotin carboxylates, for example, in which the triorganotin moiety is linked to a polymeric chain through a carboxyl group.

The polymeric backbone may be formed first by polymerising a vinyl carboxylic acid, or copolymerising a vinyl carboxylic acid with another vinyl monomer, and then reacting the resulting polymer or copolymer with a stoichiometric amount of a bis-triorganotin oxide or a triorganotin hydroxide of the general formula $(R_1R_2R_3Sn)_2O$ or $R_1R_2R_3SnOH$, where $R_1$, $R_2$ and $R_3$ are organic radicals. Alternatively, the monomeric triorganotin carboxylates may be preformed from the monomeric acid and the appropriate triorganotin compound and vinyl carboxylic acid, and subsequently polymerised.

According to another aspect of the present invention, the base polymer is reacted with a triorganotin oxide, e.g. tributyltin oxide, and the dehydrating agent is then added in a sufficient amount to remove the water formed and to maintain the necessary anhydrous conditions of the paint formulation. The amount is adjusted to take account of moisture imported into the formulation by any other additives and the effect of moisture in the ambient atmosphere.

As stated above, a preferred polymer or copolymer residue (X) is that of a substituted or unsubstituted vinyl or acrylic carboxylate. Examples of suitable polymers include salts of $\alpha,\beta$-unsaturated acids and organotin groups, e.g. tri-n-butyltin acrylate or methacrylate, and copolymers such as copolymers of tri-n-butyltin methacrylate and methyl methacrylate and of tri-n-butyltin methacrylate, methyl methacrylate and n-butyl acrylate. Reference is made in this connection of U.K. Pat. No. 1,124,297 (discussed above) which gives various examples.

As explained in that prior art Patent, the copolymers, are preferred since, by appropriate choice of comonomers, desired physical and mechanical properties can be imparted to the paint formulations.

As also discussed above, we may use polymers of the formula disclosed in U.K. Pat. No. 1,058,701, i.e., $R_3SnOOCR'$ in which R is lower alkyl (i.e. $C_{1-10}$) or phenyl and R' is a polymerisable vinyl, $\alpha$-methylvinyl or vinylphenyl group, including hydrocarbontin salts of p-vinylbenzoic acid as disclosed in U.K. Pat. No. 952,490 (also in the name of M. & T. Chemicals Inc.).

Similarly, we may use trialkyltin polymers as disclosed in U.K. Pat. No. 1,434,234 (Commonwealth of Australia), i.e., polymers comprising the following recurring units:

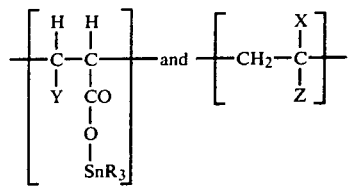

in which:
R is a propyl or butyl group,
X is hydrogen or methyl,
Y is hydrogen or $-CO-O-SnR_3$, and
Z in $-OCOCH_3$, $COOCH_3-$, $CONH_2$, COOH or Cl provided that when Z is Cl, X is hydrogen.

Examples of organotin compounds comprising dicarboxylate residues which may be used include homopolymers or copolymers as disclosed in U.K. Pat. No. 1,270,922, i.e., polymers or copolymers of bis-(trihydrocarbyltin)maleate of the forumla:

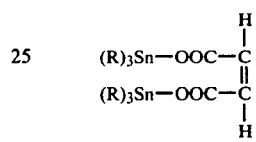

in which R is a hydrocarbon radical.

Typical triorganotin acrylates suitable for use in this invention include tri-n-butyltin acrylate, tri-n-propyltin acrylate, tri-isopropyltin acrylate, tri-sec-butylin acrylate, triethyltin acrylate, tribenzyltin acrylate, diethylbutyltin acrylate, diethylamyltin acrylate, diamylmethyltin acrylate, triphenyltin acrylate, diethylhexyltin acrylate, propylbutylamyltin acrylate, tritolyltin acrylate, tribromophenyltin acrylate, diphenyltolyltin acrylate, tri(p-ethylphenyl)-tin acrylate, diethylphenyltin acrylate, ethyldiphenyltin acrylate, n-octyldiphenyltin acrylate, diethyl-p-bromophenyltin acrylate and diethyloctyltin acrylate.

Typical triorganotin methacrylates suitable for use in this invention include tri-n-butyltin methacrylate tri-n-propyltin methacrylate, tri-isopropyltin methacrylate, tri-sec-butyltin methacrylate, triethyltin methacrylate, diethylbutyltin methacrylate, diethylamyltin methacrylate, diamylmethyltin methacrylate, propylbutylamyltin methacrylate, diethylhexyltin methacrylate, triphenyltin methacrylate, tritolyltin methacrylate, tribromophenyltin methacrylate, di-phneyltolyltin methacrylate, tri(p-ethylphenyl)-tin methacrylate, diethylphenyltin methacrylate, ethyldiphenyltin methacrylate, n-octyldiphenyltin methacrylate, diethyl-p-bromophenyltin methacrylate and diethyloctyltin methacrylate.

Typical triorganotin, vinylbenzoates include tri-n-butyltin p-vinylbenzoate, tri-n-propyltin p-vinylbenzoate, tri-isopropyltin-p-vinylbenzoate, tri-sec-butyltin m-vinylbenzoate, triethyltin o-vinylbenzoate, diethylbutyltin p-vinylbenzoate, diethylamyltin m-vinylbenzoate, diamylmethyltin p-vinylbenzoate, propylbutylamyltin p-vinylbenzoate, diethylhexyltin o-vinylbenzoate, triphenyltin p-vinylbenzoate, tritolyltin p-vinylbenzoate, tribromophenyltin p-vinylbenzoate, diphenyltolyltin p-vinylbenzoate, tri(p-ethylphenyl)-tin p-vinylbenzoate, diethylphenyltin p-vinylbenzoate, ethyldiphenyltin p-vinylbenzoate, n-octyldiphenyltin p- vinylbenzoate, diethyl p-bromophenyltin p-vinylbenzoate and diethyloctyltin p-vinylbenzoate.

The monomeric compounds are obtained from commerce or made by any of the known techniques for preparing organotin esters, e.g., the reaction between triphentyltin hydroxide and methacrylic acid.

In the case of copolymers derived from one or more monomers of the formula:

$$R^4-COO-SnR^1R^2R^3 \qquad (II)$$

wherein $R^4$ is an $\alpha,\beta$-unsaturated aliphatic monomer, e.g. an unsubstituted or substituted vinyl or acrylic monomer, and
one or more ethylenically unsaturated comonomers, the comonomers may include vinyl monomers such as vinyl chloride, styrene, p-chlorostyrene, vinyl acetate or vinyl butyrate, acrylic monomers such as methyl acrylate, methyl methacrylate, ethyl acrylate, acrylic acid, methacrylamide, methacrylic acid, acrylamide or acrylonitrile and other ethylenically unsaturated comonomers such as maleic acid, maleic anhydride or organometallic monomers, e.g. phenyl mercury methacrylate or di-n-butyltin bis-(methacrylate).

We may also use two or more polymers and/or copolymers of the formula (I) above, e.g. tri-n-propyltin methacrylate-tri-n-butyltin methacrylate copolymers, tri-n-butyltin acrylate-triphenyltin acrylate copolymers and tri-n-butyltin p-vinylbenzoate-tri-isopropyltin p-vinylbenzoate copolymers (see, in this connection, U.K. Pat. No. 1,058,701).

The polymers or copolymers of the invention may be prepared by various techniques of free radical polymerization which may be carried out in bulk, in solution, in emulsion or in suspension. Polymerization may be initiated by various suitable free radical initiators including benzoylperoxide, di-t-butylperoxide, lauroylperoxide, cumene hydroperoxide, azobis-isobutyronitrile, methylethylketone peroxide, persylphatebisulphite redox catalysts and persulphate mercaptin redox catalysts. The polymerization may be carried out at any suitable temperature depending on the catalyst system employed but temperatures in the range of from 40° to 90° C. are preferred. Various polymerization control agents such as accelerators, chain-transfer agents, surface-active agents and suspending agents may also be employed if desired.

The dehydrating agent in the antifouling paints or paint compositions of the invention is a compound or substance of low water solubility and of relatively inert character which takes up water either physically or chemically including by absorption or by adsorption under ambient conditions (0° C. to 35° C.). Metal salts which are relatively inert and have a low water solubility in both anhydrous and hydrated forms, e.g. anhydrous calcium sulphate, CaSO$_4$ (Keenes cement) or calcium sulphate hemihydrate, CaSO$_4\cdot\frac{1}{2}$H$_2$O are preferred dehydrating agents according to the invention. However, we may also use various organic, in particular aliphatic or aromatic mono-, di- or polyisocyanates. The aliphatic isocyanates are generally saturated aliphatic monoisocyanates and may be of various lengths from C$_1$-alkyl to C$_{16}$ or C$_{18}$ alkyl isocyanate, depending upon the desired physical properties of the dehydrating agent in the paint formulation. The aromatic isocyanates are preferably phenyl mono- or di-isocyanates, e.g. toluene-2,4-diisocyanate.

We may also use various polymeric isocyanates such an "Additive T1" sold by Bayer A.G. of Leverkusen, Germany.

Various organic esters capable of taking up water under ambient conditions may also be used, e.g. triethylorthoformate. Various molecular sieves or zeolites of inert character but capable of taking up water may also be used.

Similarly, organometallic compounds such as Grignard reagents which are capable of taking up water are also included within the scope of the invention. Strong acids or anhydrides such as H$_2$SO$_4$ or P$_2$O$_5$ and highly water-soluble salts such as anhydrous sodium sulphate or calcium chloride should be avoided.

Optionally, other components toxic to marine life may be used in addition to the tin carboxylate polymers or copolymers and the cuprous oxide of the invention. Thus, other metal- or non-metal containing polymers or copolymers which are toxic to marine life, e.g. zinc or arsenic containing polymers or copolymers, may also be used or other oxides such as zinc oxide. Furthermore, additional inorganic pigments such as titanium dioxide or lead oxide and organic resins such as alkyd or polyurethane resins may be additionally present if desired. Similarly, the paints of the invention may include various inert solvents, thinners, extenders or diluents such as benzene, toluene, naphtha, methylethyl ketone and mineral spirits or petroleum fractions such as ligroin and solid diluents or additives such as various clays or talcs, ground limestone or diatomaceous earth, thickness such as bentonite, fillers such as aluminum silicate or calcium silicate and drying agents such as cobalt naphthenate or manganese naphthenate.

Various plasticizers may also be present if desired.

Finally, any of the various other additives normally used in paint formulations and not specifically enumerated above may be incorporated in the paints of the invention provided that none of these optional components interferes with the major requirements of the invention that the combination of the polymer or copolymer component or components (I) and the cuprous oxide should be kept relatively free of moisture by the dehydrating agent or agents which must be present in sufficient proportions to ensure such relatively H$_2$O-free conditions. The amounts of desiccant needed to achieve this effect will vary according to the nature and proportions of the other components and also the conditions under which the paint is to be stored and eventually used. However, we would not normally expect to use a total desiccant amount of more than 5% by weight based on the total composition and total amounts of desiccant such as Keenes Cement (CaSO$_4$) and/or CaSO$_4\cdot\frac{1}{2}$H$_2$O between 2 and 3%, preferably substantially 2.5% by weight based on the total composition will normally prove satisfactory.

Similarly, the relative proportions of (a) cuprous oxide and (b) total organotin carboxylate polymer or copolymer component may be varied within a wide range depending upon the desired physical and chemical properties of the paint. The ratio of (a) to (b) may vary for example from 3:1 to 1:3, a ratio of substantially 1:1 being acceptable in many cases. Furthermore, the proportion of each of the components (a) and (b) in the total paint may vary from 10% to 50%, but amounts of each component in the region of about 25–30% are more usual. When zinc oxide (c) is employed as a toxic pigment in addition to cuprous oxide the ratio of (c) to (a) is normally in the region of about 1:2 and the total of (a) and (c) in the composition is generally in the region of about 45–55% by weight, in particular about 50% by weight.

The amounts of resins which are inert to marine or vegetable life will again depend on the particular requirements for the paint. However, in general, the desired physical properties are obtained by appropriate choice of comonomers used in building up the compounds (I). Nevertheless, we may use up to 10% or even more, i.e., between 10% and 20%., or up to 30% is special cases of such "inert" resins in admixture with the biologically active polymers or copolymers (I) of the invention.

A preferred solvent, thinner, diluent or extender is xylene. Xylene, substitutes therefor or mixtures which may include xylene may be used in various proportions as will be understood by skilled persons in the art. Proportions of up to 20% or more of such diluents or thinners depending upon the other ingredients and the particular requirements. Specific ingredients which may be used in minor proportions include, for example, tri-n-butyltin oxide in proportions ranging between 1 and 10% as an additional poison to marine life, bentonite in proportions of between 2.5 and 5% by weight, 8-hydroxyquinoline in amounts of generally not more than about 2–3%, preferably between 0.5 and 1% by weight, hydroquinone aluminosilicates, thixotropes and hexane-2,4-dione in similar amounts, and methylisobutylketone in amounts of generally not more than substantially 10%.

Experiments were carried out with three different formulations (A, B and C) to test the effectiveness of the association of cuprous oxide with triorganotin carboxylate polymers. The formulations were as follows (the amounts given being in parts by weight):

| Formulation | A | B |
|---|---|---|
| Tributyl tin methacrylate/methyl methacrylate copolymer (2:1 - 50% solids in xylene)* | 32.6 | 36.00 |
| Paraloid[1] B66 (50% solids in xylene) | 10.00 | — |
| Cuprous oxide | 47.00 | — |
| Zinc oxide | 23.00 | 48.00 |
| Magnesium oxide | 1.00 | 1.00 |
| 15% Bentone B34[2] in Solvesso[3] 100 | 2.00 | 2.00 |
| Xylene/Butanol 7:1 solvent mix | 12.00 | 12.00 |

NOTES:
*Nissan Co. Japan
[1](trade mark) aromatic-soluble acrylic resin sold by Rohm & Haas Ltd.
[2](trade mark of Abbey Chemicals Ltd.) sold by Steeetley Minerals Ltd., mineral thixotrope modified montmorillonite clay.
[3](trade mark of Esso Chemicals) aromatic solvent.

Formulation C

A system to manufacturer's recommendation, (International Paint Co.—S.P.C. formulation) in three coats at 75 microns (pink), 100 microns (grey), 100 microns (grey), claimed to be an organotin copolymer composition. Given the colour of the second and third coats and analytical data, no cuprous oxide was present in these coats.

Tests were carried out in accordance with the official report of the Research Organisation for Ships' Compositions' Manufacturers (R.O.S.C.M.).

The ratings were estimated visually and each species is judged as to the intensity on a scale of "slight", "moderate", "severe" and "very severe" settlement by an experienced observer.

The importance of the various organisms is also rated.

For most purposes, slimes are not considered serious fouling whereas brown and green algae, in this case Ectocarpus sp (Ect.) and Enteromorpha (Ent) are serious fouling forms.

The results were collected and tabulated in Table I as follows:

TABLE I

| Treatment Composition | Days on Test* | | | |
|---|---|---|---|---|
| | 247 | 361 | 468 | 587 |
| Formulation A | Trace Slime | Trace Slime | Moderate Slime | Very Severe Slime |
| Formulation B without cuprous | Trace Ect. and Ent. | Severe Slime | Trace Ect. Severe Slime | Severe Ect. |
| Formulation C | Trace Slime | Moderate Slime | Severe Slime, Ect. | Severe Slime, Moderate Ect. |

*Ratings taken from R.O.S.C.M. report (Poole Harbour Test Station).
NOTE
A and B compositions applied as two coats at 100 microns dry film thickness. C as first coat 75 microns, second and third coats at 100 microns.
The coatings were carried out in standard manner, that of "C" being according to Manufacturer's (I.P.C.) recommendation.

It was noted that, over 587 days, no weed fouling settlements occurred in the case of the cuprous oxide-containing Formulation A. The weakness of the organotin formulations B and C from which cuprous oxide was absent was quite marked.

The stability of various organotin copolymer/cuprous oxide compositions with various desiccants was then investigated. The results are set out in Table II below.

TABLE II

Stability of Organo-Tin Copolymer/Cuprous Oxide Compositions with Various Dessicants

| Ingredient | | Sample No. (all amounts by weight) | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| OMP2 | (4) | 30.5 | 30.5 | 30.5 | 30.5 | 30.5 | 30.5 | 30.5 | — | — | — | — | — | — | — | — |
| CNS474 | (5) | — | — | — | — | — | — | — | — | — | — | — | 30.5 | 30.5 | — | — |
| CN9S70 | (6) | — | — | — | — | — | — | — | — | — | — | — | — | — | 45.0 | 45.0 |
| Scrip set 550 Tri-n-butyl tin | (7) | — | — | — | — | — | — | — | 7.43 | 7.43 | 7.43 | 7.43 | — | — | — | — |

TABLE II-continued

Stability of Organo-Tin Copolymer/Cuprous Oxide Compositions with Various Dessicants Sample No. (all amounts by weight)

| Ingredient | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Oxide | | 1.1 | 1.1 | 1.1 | 1.1 | 1.1 | — | — | 9.00 | 9.00 | 9.00 | 9.00 | 1.1 | 1.1 | 1.1 | 1.1 |
| Cuprous Oxide | | 30.5 | 30.5 | 30.5 | 30.5 | 30.5 | 30.5 | 30.5 | 30.5 | 30.5 | 30.5 | 30.5 | 30.5 | 30.5 | 30.5 | 30.5 |
| Zinc Oxide | | 15.3 | 15.3 | 15.3 | 15.3 | 15.3 | 15.3 | 15.3 | 15.3 | 15.3 | 15.3 | 15.3 | 15.3 | 15.3 | 15.3 | 15.3 |
| CaSO$_4\frac{1}{2}$H$_2$O | | 2.6 | — | — | — | 2.6 | 2.6 | 2.6 | 2.6 | — | — | — | 2.6 | — | 2.6 | — |
| CaSO$_4$ (Keenes) | | — | — | 2.5 | — | — | — | — | — | — | 2.6 | — | — | — | — | — |
| 15% Bentone B34 in Solvesso 100 | (2) (3) | 3.0 | 3.0 | 3.0 | 3.0 | 3.0 | 3.0 | 3.0 | 3.0 | 3.0 | 3.0 | 3.0 | 2.9 | 2.9 | 2.9 | 2.9 |
| Xylene | | 15.6 | 15.6 | 15.6 | 15.6 | 15.6 | 15.6 | 15.6 | 10.5 | 10.5 | 10.5 | 10.5 | 13.0 | 13.0 | 5.8 | 5.8 |
| S-Hydroxy Quinoline | | — | — | — | — | 1.0 | — | 0.5 | 0.9 | 0.9 | 0.9 | 0.9 | | | | |
| Hydroquinone | | | | | | | 1.0 | — | — | — | — | — | | | | |
| Hexane 2,4-Dione | | | | | | | | 0.5 | — | — | — | — | | | | |
| MIBK | (8) | | | | | | | | 10.6 | 10.6 | 10.6 | 10.6 | | | | |
| Sylodex | (9) | 1 | 1 | 1 | 1 | 1 | 1 | 1 | 1 | 1 | 1 | 1 | | | | |
| Thixatrol ST | (10) | 0.5 | 0.5 | 0.5 | 0.5 | 0.5 | 0.5 | 0.5 | 0.5 | 0.5 | 0.5 | 0.5 | | | | |
| Viscosity T=0 | (11) (12) | 5.5 | 5.3 | 5.2 | 5.3 | 5.0 | 6.0 | 5.0 | 6.0 | 6.0 | 6.1 | gelled | 4.9 | 6.3 | 4.8 | 5.8 |
| Viscosity T=3Mo | (13) | 6.0 | 15.0 | 6.2 | 15.0 | 5.3 | — | 5.3 | 6.2 | 12.0 | 6.1 | — | 5.3 | 15.0 | 6.0 | 12 |
| Viscosity T=12Mo | | 6.5 | gelled | 6.6 | gelled | 5.6 | — | 5.3 | 6.3 | gelled | 6.5 | — | — | — | — | — |

NOTES:
(4)A tributyl tin methacrylate/methyl methacrylate copolymer sold by M. & T. Ltd. (50% solids in xylene).
(5)A tributyl tin methacrylate/methyl methacrylate copolymer sold by M. & T. Ltd. (50% solids in xylene).
(6)A tributyl tin methacrylate/methyl methacrylate copolymer sold by M. & T. Ltd. (34% solids in xylene).
(7)A styrene/maleic anhydride resin sold by Monsanto Ltd.
(8)Methyl isobutyl ketone.
(9)Aluminosilicate filler manufactured by Grace Bros. Ltd.
(10)Hydrogenated castor oil thixatrol ST sold by Baker Castor Oil Co. Ltd.
(11)The viscosity determinations were by I.C.I. Roto-Thinner (trade mark) Viscometer at 20° C. and were measured in poises.
(12)T = time of storage
(13)Mo = months.

We claim:

1. In an antifouling marine coating composition comprising a cuprous oxide pigment and a triorganotin compound selected from the group consisting of triorganotin carboxylate homopolymers and triorganotin carboxylate copolymers, the cuprous oxide pigment and the triorganotin compound co-acting to provide an extremely effective coating toxic to marine life, the improvement comprising the presence of a desiccant for increasing the storage life of the composition, the desiccants being relatively inert and of low water solubility and capable of taking up water either physically or chemically, the desiccant being present in the coating composition in an amount sufficient to keep the cuprous oxide pigment and triorganotin compound relatively free of moisture.

2. A composition according to claim 1, in which the desiccant is a relatively inert metal salt of low water solubility.

3. A composition according to claim 2, in which the desiccant is calcium sulphate in anhydrous and/or hemihydrate form.

4. A composition according to claim 1, in which in formula (I), alkyl is C$_{1-10}$alkyl, cycloalkyl is C$_{3-10}$cycloalkyl, aralkyl is phenyl-C$_{1-10}$alkyl, aryl is phenyl and alkaryl is C$_{1-10}$alkylphenyl, and any optional substituents are chloro, bromo, C$_{1-16}$alkyl, ether, C$_{2-6}$alkenyl and C$_{2-6}$alkynyl.

5. The composition according to claim 1, in which the triorganotin compound is selected from the group consisting of tri-n-butyltin methacrylate-methyl methacrylate and tri-n-butyltin methacrylate-methyl methacrylate-n-butyl acrylate copolymers.

6. The composition of claim 1 wherein the triorganotin compound has the formula:

$$X-COO-SnR^1R^2R^3$$

wherein R$^1$, R$^2$ and R$^3$ are selected from the group consisting of identical and different alkyl, cycloalkyl, aralkyl, aryl and alkaryl substituents, and substituted such substituents; and X is selected from the group consisting of moieties derived from the polymerization of copolymerization of organic mono-, di- and tri-carboxylic acids.

7. The composition of claim 1 wherein the desiccant is present in an amount of up to about 5% by weight of the total composition.

8. The composition of claim 3 wherein the desiccant is present in an amount of between 2% and 3% by weight of the total composition.

9. The composition of claim 1 wherein the desiccant is selected from the group consisting of anhydrous and partially anhydrous metal salts, organic mono-, di- and polyisocyanates, organic esters, molecular sieves and Grignard reagents.

10. The composition of claim 6 wherein the moiety X is derived from the polymerization of groups selected from the group consisting of substituted and unsubstituted vinyl and acrylic groups.

11. The composition of claim 10 wherein the triorganotin compound is selected from the group consisting of polymers of tri-n-butyltin acrylate, tri-n-butyltin methacrylate, and tri-n-butyltin acrylatemethacrylate.

* * * * *